United States Patent
Han et al.

(10) Patent No.: US 9,468,021 B2
(45) Date of Patent: Oct. 11, 2016

(54) METHOD, APPARATUS, AND SYSTEM FOR COMMUNICATION INFORMATION TRANSMISSION

(71) Applicant: Huawei Technologies Co., Ltd., Shenzhen, Guangdong (CN)

(72) Inventors: Guanglin Han, Shenzhen (CN); Wei Quan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 471 days.

(21) Appl. No.: 13/925,075

(22) Filed: Jun. 24, 2013

(65) Prior Publication Data
US 2013/0279453 A1 Oct. 24, 2013

Related U.S. Application Data

(63) Continuation of application No. PCT/CN2011/084619, filed on Dec. 26, 2011.

(30) Foreign Application Priority Data

Dec. 24, 2010 (CN) .......................... 2010-1-0614982

(51) Int. Cl.
*H04W 4/00* (2009.01)
*H04W 74/08* (2009.01)

(52) U.S. Cl.
CPC ..... *H04W 74/0833* (2013.01); *H04W 74/0841* (2013.01)

(58) Field of Classification Search
CPC .................... H04W 74/0833; H04W 74/0841
USPC ......................................... 455/452; 370/329
See application file for complete search history.

(56) References Cited

U.S. PATENT DOCUMENTS

| 5,339,313 A | 8/1994 | Ben-Michael et al. |
| 5,600,651 A | 2/1997 | Molle et al. |

(Continued)

FOREIGN PATENT DOCUMENTS

| CN | 1777333 A | 5/2006 |
| CN | 1794687 A | 6/2006 |

(Continued)

OTHER PUBLICATIONS

"3GPP TS 36.321— 3rd Generation Partnership Project; Technical Specification Group Radio Access Network; Evolved Universal Terrestrial Radio Access (E-UTRA); Medium Access Control (MAC) protocol specification (Release 10)," Dec. 2010, Version 10.0.0, 3rd Generation Partnership Project, Valbonne, France.

(Continued)

*Primary Examiner* — Faisal Choudhury
(74) *Attorney, Agent, or Firm* — Leydig, Voit & Mayer, Ltd.

(57) ABSTRACT

A method, apparatus, and system for communication information transmission are provided in the embodiments of the present invention. The method comprises: communication information is transmitted to a base station (BS); when the communication information fails to be transmitted to the BS, a first backoff upper limit is obtained according to the number of times the transmission has failed; a backoff upper limit is determined according to the first backoff upper limit, and a backoff time of retransmitting the communication information is selected according to the backoff upper limit. In the embodiments of the present invention, terminal can obtain the proper backoff upper limit according to the number of times it has failed to transmit the communication information, thereby reducing the latency of its uplink data transmission.

19 Claims, 4 Drawing Sheets

(56) References Cited

U.S. PATENT DOCUMENTS

| | | | |
|---|---|---|---|
| 5,966,375 A | 10/1999 | Kagaya | |
| 6,961,344 B1 | 11/2005 | Gaspar et al. | |
| 7,180,905 B2 | 2/2007 | Benveniste | |
| 7,359,705 B2* | 4/2008 | Kornprobst | H04W 74/085 370/448 |
| 7,620,747 B1 | 11/2009 | Overby et al. | |
| 8,964,545 B2* | 2/2015 | Johansson | 370/232 |
| 2003/0114113 A1 | 6/2003 | Kornprobst | |
| 2004/0032877 A1* | 2/2004 | Chuah et al. | 370/444 |
| 2007/0047570 A1* | 3/2007 | Benveniste | 370/448 |
| 2008/0013508 A1 | 1/2008 | Benveniste | |
| 2008/0101286 A1* | 5/2008 | Wang | H04W 72/1268 370/329 |
| 2010/0081394 A1* | 4/2010 | Mashimo | 455/70 |
| 2010/0124171 A1* | 5/2010 | Yoneyama et al. | 370/242 |
| 2011/0249568 A1* | 10/2011 | Desai et al. | 370/242 |
| 2011/0292895 A1* | 12/2011 | Wager et al. | 370/329 |
| 2012/0155295 A1* | 6/2012 | Trainin | H04W 74/0808 370/252 |

FOREIGN PATENT DOCUMENTS

| | | |
|---|---|---|
| CN | 101695195 A | 4/2010 |
| CN | 101848539 A | 9/2010 |
| EP | 1035745 A1 | 9/2000 |
| JP | 2009049465 A | 3/2009 |
| WO | 9610306 A1 | 4/1996 |

OTHER PUBLICATIONS

International Search Report in corresponding PCT Patent Application No. PCT/CN2011/084619 (Apr. 5, 2012).

Written Opinion of the International Searching Authority in corresponding PCT Patent Application No. PCT/CN2011/084619 (Apr. 5, 2012).

* cited by examiner

METHOD, APPARATUS, AND SYSTEM FOR COMMUNICATION INFORMATION TRANSMISSION

CROSS-REFERENCE TO RELATED APPLICATIONS

This application is a continuation of International Patent Application No. PCT/CN2011/084619, filed on Dec. 26, 2011, which claims priority to Chinese Patent Application No. 201010614982.5, filed on Dec. 24, 2010, both of which are hereby incorporated by reference in their entireties.

FIELD OF THE INVENTION

Embodiments of this invention relate to the technical field of communications, and more particularly, to a method, an apparatus, and a system for communication information transmission.

BACKGROUND OF THE INVENTION

There may be plural terminals in a single communication cell to transmit random access signals to a base station. When plural terminals transmit random access signals to a base station, the plural terminals simultaneously make use of the same and single competed resource, and this will cause competition conflict that leads to failure of service transmissions of the plural terminals.

After the plural terminals fail in the competed resource for the processes of random access, each terminal that has failed the competition can receive from a message sent by the network side a maximum backoff upper limit for initiating the next random access. After the terminal that failed the competition receives the maximum backoff upper limit, it selects from 0 to the maximum backoff upper limit a random value as a backoff time for initiating the next random access.

Once the competition has been failed, the maximum backoff upper limit received by all terminals that have failed the competition is identical. However, for partial terminals that have failed the competition, their failure in the competition may not be caused by heavy network load, in which case there is no need to wait for a relatively long backoff time. Nevertheless, according to the current mechanism, each terminal that has failed the competition inevitably randomly selects the backoff time according to this maximum backoff upper limit, whereby each terminal may select a relatively long backoff time, thus leading to delay in the transmission of uplink data by the terminals.

SUMMARY OF THE INVENTION

Embodiments of the present invention provide a method, an apparatus and a system for communication information transmission, whereby it is made possible for the terminals to each select a suitable backoff time, and to reduce delay in the transmission of uplink data by the terminals.

An embodiment of the present invention provides a method for communication information transmission, comprising: transmitting communication information to a base station; obtaining a first backoff upper limit, when the communication information fails to be transmitted to the base station, according to the number of times the transmission has failed; and determining a backoff upper limit according to the first backoff upper limit, and selecting a backoff time for retransmitting the communication information according to the backoff upper limit.

Another embodiment of the present invention provides an apparatus for communication information transmission, comprising: a transmitting module, configured to transmit communication information to a base station; an upper limit obtaining module, configured to obtain a first backoff upper limit, when the transmitting module fails to transmit the communication information to the base station, according to the number of times the transmission has failed; and a first selecting module, configured to determine a backoff upper limit according to the first backoff upper limit obtained by the upper limit obtaining module, and selecting a backoff time for retransmitting the communication information according to the backoff upper limit.

Still another embodiment of the present invention provides a system for communication information transmission, comprising: a base station and a terminal, of which the terminal comprises any apparatus for communication information transmission according to the embodiment of the present invention.

According to the method, apparatus and system for communication information transmission provided by the embodiments of the present invention, when failing to transmit communication information to the base station, a terminal obtains a first backoff upper limit according to the number of times the transmission has failed, determines a backoff upper limit according to the first backoff upper limit, and selects a backoff time for retransmitting the communication information according to the backoff upper limit, so that the terminal can obtain a suitable backoff upper limit according to the number of times it has failed to transmit the communication information, thereby reducing the delay in the transmission of uplink data by the terminal.

BRIEF DESCRIPTION OF THE DRAWINGS

To make clearer the explanation of technical solutions of the embodiments of the present invention, accompanying drawings needed in the description of the embodiments are briefly illustrated below. Apparently, the accompanying drawings illustrated below are merely directed to some embodiments of the present invention, and it is possible for persons ordinarily skilled in the art to deduce other drawings from these drawings without creative effort.

DETAILED DESCRIPTION OF THE EMBODIMENTS

Technical solutions in the embodiments of the present invention will be clearly and completely described below with reference to the accompanying drawings in the embodiments of the present invention. Apparently, the embodiments herein described are merely partial, rather than entire, embodiments of the present invention. All other embodiments obtainable by persons ordinarily skilled in the art on the basis of the embodiments of the present invention and thus without creative effort shall fall within the protection scope of the present invention.

To make clearer and more apparent the objectives, technical solutions and advantages of the embodiments of the present invention, description will be made in greater detail below to explain the technical solutions in the embodiments of the present invention with reference to the accompanying drawings. Apparently, the embodiments herein described are partial, rather than entire, embodiments of the present invention. All other embodiments obtainable by persons ordinarily skilled in the art on the basis of the embodiments of the present invention and thus without creative effort shall fall within the protection scope of the present invention.

Figure 1:
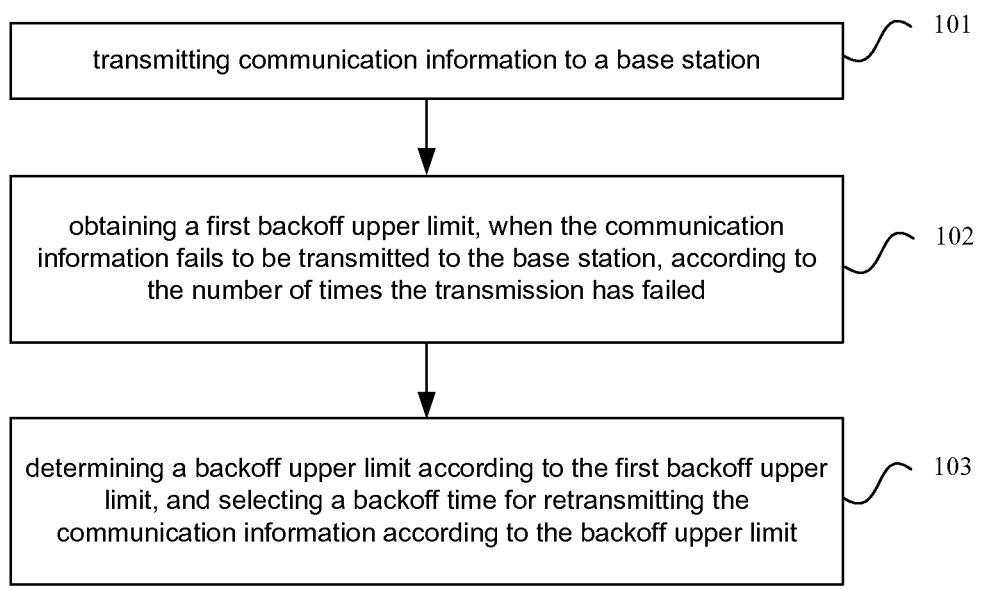
FIG. 1 is a flowchart illustrating the first embodiment of a method for communication information transmission according to the present invention.

FIG. 1 is a flowchart illustrating the first embodiment of a method for communication information transmission according to the present invention. As shown in FIG. 1, the method comprises the following steps.

Step 101: transmitting communication information to a base station.

The executing main body of this embodiment is a user equipment (hereinafter abbreviated as "UE"). During the process of communication, the UE may transmit communication information to a base station, and the communication information may be a random access signal, scheduling request resource signaling or service data.

Step 102: obtaining a first backoff upper limit, when the communication information fails to be transmitted to the base station, according to the number of times the transmission has failed.

When the UE fails competition to transmit the communication information due to conflict with other UEs, the UE may learn the failure of the competition to transmit the communication information through detection by UE itself or through an instruction from the network side. For example, it can be considered that the competition for transmitting the communication information has been failed when the UE does not receive any confirmation message for a certain time, or when the UE detects conflicting signal(s) sent by other UEs or the network side. For further example, it can be considered that the competition for transmitting the communication information has been failed when the UE receives feedback information indicating competition failure from the network side, or when the UE does not receive any feedback information from the network side.

After the UE learns that the competition for transmitting the communication information to the base station has been failed, the UE obtains a first backoff upper limit according to the number of times the transmission has failed. Specifically, insofar as general communication information is concerned, the more number of times the transmission has failed, the greater will be the first backoff upper limit. However, insofar as communication information whose transmission time is restricted is concerned, the more number of times the transmission has failed, the smaller will be the first backoff upper limit.

As for the UE, if the number of times the transmission has failed is relatively fewer, the failure of transmission may not be caused by heavy network load. Thus, the UE with relatively fewer number of times the transmission has failed may select a smaller first backoff upper limit, to thereby reduce delay in the transmission of uplink data by the UE.

Step 103: determining a backoff upper limit according to the first backoff upper limit, and selecting a backoff time for retransmitting the communication information according to the backoff upper limit.

The UE takes the obtained first backoff upper limit as the backoff upper limit for selecting the backoff time, and then randomly selects a backoff time for retransmitting the communication information from a range of 0 to this backoff upper limit.

In this embodiment, when failing to transmit communication information to the base station, the UE obtains a first backoff upper limit according to the number of times the transmission has failed, determines a backoff upper limit according to the first backoff upper limit, and selects a backoff time for retransmitting the communication information according to the backoff upper limit, so that the UE can obtain a suitable backoff upper limit according to the number of times it has failed to transmit the communication information, thereby reducing the delay in the transmission of uplink data by the UE.

Figure 2:
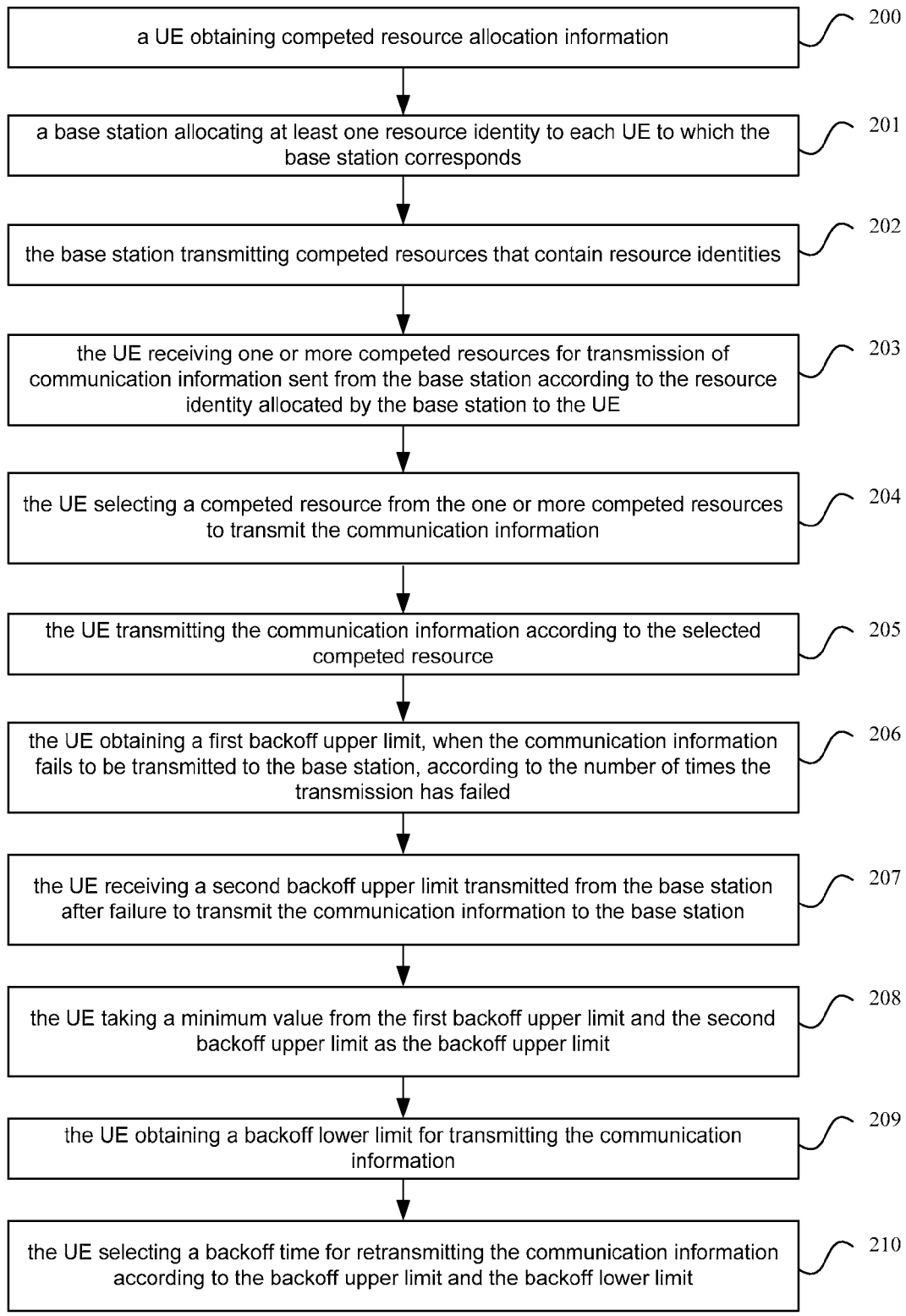
FIG. 2 is a flowchart illustrating the second embodiment of a method for communication information transmission according to the present invention.

FIG. 2 is a flowchart illustrating the second embodiment of a method for communication information transmission according to the present invention. As shown in FIG. 2, the method comprises the following steps.

Step 200: a UE obtaining competed resource configuration information.

The UE may obtain competed resource configuration information of cells through a dedicated message and/or a system broadcasting message. The dedicated message may be radio resource control (RRC) signaling. The competed resource allocation information includes at least one of the following pieces of information:

an instruction as to whether the current cell allows to compete for transmission, or as to whether the current cell has competed resource allocation;

positional information of competed resources—for example, frequency domain resource blocks used by the competed resources, reference position and offset position of the frequency domain, frame numbers (or subframe numbers) of the time domain and the period of the time domain corresponding to the competed resources, and information relevant to calculating the aforementioned positional information;

power control information and different power configuration information with respect to different competed resources—for example, the allowable maximum transmit power information and power backoff information, etc.

Step 201: a base station allocating at least one resource identity to each UE to which the base station corresponds.

Each UE to which the base station corresponds is every UE serviced by the base station.

When plural UEs transmit communication information over the same and single competed resource, transmission might fail due to the presence of great quantities of competition conflicts. In order to reduce competition conflicts and to facilitate selection by the UEs, this embodiment may further include steps for the base station to allocate plural competed resources for the UEs, namely Steps 201 through 205.

In order to allocate plural competed resources to a UE, the base station (eNodeB) may allocate in advance one or more identities of competed resources (Contention Based Transmission Radio Network Temporary Identity, abbreviated as "CB-RNTI") to each UE serviced thereby, and then the base station can carry the identity/identities allocated to a UE in the competed resources while sending down the competed resources to the UE.

Specifically, the base station may employ the following two modes to allocate CB-RNTI to the UE:

the base station divides the UEs serviced thereby into several groups each including at least one UE, and each UE may be included in different groups, then the base station allocates one CB-RNTI to each group, and this is hence equivalent to that the base station has allocated the CB-RNTI to each UE; when UE1 only belongs to one group, this is equivalent to that the base station has allocated a CB-RNTI to UE1; when UE1 belongs to a plurality of groups, this is equivalent to that the base station has allocated a plurality of CB-RNTIs to UE1. The competed resource scheduled for each group by the base station includes the CB-RNTI allocated to this group, and the competed resource can be commonly used by all UEs included in each group.

the base station allocates one or more CB-RNTIs for each UE; when the base station allocates one CB-RNTI to each UE, the one CB-RNTI may correspond to a plurality of competed resources; when the base station allocates a plurality of CB-RNTIs to each UE, one CB-RNTI may correspond to one competed resource.

Step 202: the base station transmitting competed resources that contain resource identities, wherein each resource identity corresponds to at least one competed resource.

The competed resource in this embodiment may be used to transmit a random access signal, scheduling request resource signaling or service data.

After allocating resource identities to the UEs, the base station transmits competed resources that contain resource identities, so as to schedule the competed resources for each UE. Each resource identity may correspond to one competed resource or a plurality of competed resources.

Step 203: the UE receiving one or more competed resources for transmission of communication information sent from the base station according to the resource identity allocated by the base station to the UE.

After allocating resource identities to each UE, the base station transmits competed resources that contain resource identities, and each UE can receive the competed resource allocated to it according to the resource identities contained in the competed resources sent by the base station. For example, the base station allocates resource identity A and resource identity B to UE1, i.e., all competed resources containing resource identity A and resource identity B are allocated by the base station to UE1, and UE1 can receive all competed resources containing resource identity A and resource identity B.

When there is communication information, such as a random access signal, scheduling request resource signaling or service data, to be transmitted by a UE, the UE may obtain exact time domain and/or frequency domain information of one or more competed resources, to which the UE corresponds, at a certain time slot through a dedicated message and/or a system broadcasting message; alternatively, the UE may also obtain the competed resources, to which the UE corresponds, at each transmission interval through physical layer signaling and through detection of physical layer scheduling signaling, in which case each competed resource may be transferred to the UE through one or more physical layer messages, and the UE identifies whether the competed resource is transmitted to it through CB-RNTIs carried in the physical layer messages.

Step 204: the UE selecting a competed resource from the one or more competed resources to transmit the communication information.

There are the following specific modes for the UE to select a competed resource from the one or more competed resources:

first mode: the UE randomly selects a competed resource from the one or more competed resources to transmit the communication information;

second mode: the UE acquires a modulus of the number of a plurality of competed resources with respect to a numerical value of identity information of a current terminal to obtain a first remainder, and selects a competed resource that corresponds to the first remainder to transmit the communication information. For example, 4 competed resources are allocated to UE2, and the identity of UE2 is 7 or 11, then a remainder 3 is obtained by acquiring the modulus of the identity of UE2, whereby the third competed resource is selected to transmit the communication information.

Step 205: the UE transmitting the communication information according to the selected competed resource.

Step 206: the UE obtaining a first backoff upper limit, when the communication information fails to be transmitted to the base station, according to the number of times the transmission has failed.

When the UE obtains the first backoff upper limit according to the number of times the transmission has failed, the numerical value of the first backoff upper limit may either increase with an increase in the number of times the transmission has failed or decrease with an increase in the number of times the transmission has failed.

When the numerical value of the first backoff upper limit increases with an increase in the number of times the transmission has failed, the step of obtaining the first backoff upper limit according to the number of times the transmission has failed may specifically include: the UE obtaining a backoff parameter according to a signal transmitted from the base station and obtaining the first backoff upper limit according to formula 1: $T1=2^{(i-1)}*T2$, or $T1=(i-1)*T2$, where i represents the number of times the transmission has failed, T1 represents the first backoff upper limit, and T2 represents the backoff parameter. As a specific embodiment, the backoff parameter may be an allocation interval of competed resources required for transmitting the communication information. The allocation interval may be directly obtained from the base station, or obtained through calculation according to the number of competed resources sent by the base station within a period of time.

When the numerical value of the first backoff upper limit decreases with an increase in the number of times the transmission has failed, the step of obtaining the first backoff upper limit according to the number of times the transmission has failed may specifically include: obtaining a first time already taken to transmit the communication information and a delay requirement corresponding to transmission of the communication information, and obtaining the first backoff upper limit according to the first time and the delay requirement. As a specific embodiment, the first backoff upper limit is equal to a difference between the delay requirement and the first time. For example, the delay requirement for transmission of certain communication information is m seconds, the first time already taken to transmit the communication information is m1 seconds, and the first time is the time from the moment when the communication information is first transmitted to the moment when the first time is obtained, then the first backoff upper limit to which the communication information corresponds is m-m1. Services that put relatively high delay requirement are, for instance, services that trigger processes, logical channels or supported QoS (Quality of Services), or services that will not meet the QoS requirement due to previous failure of requests.

Step 207: the UE receiving a second backoff upper limit transmitted from the base station after failure to transmit the communication information to the base station.

When the communication information is failed to be transmitted to the base station, the UE may receive a second backoff upper limit transmitted from the base station through physical layer signaling, system broadcasting or a dedicated message.

This embodiment does not restrict the sequence of executing Steps 206 and 207.

Step 208: the UE taking a minimum value from the first backoff upper limit and the second backoff upper limit as the backoff upper limit.

The UE takes a minimum value from the first backoff upper limit and the second backoff upper limit as the backoff upper limit, and then randomly selects a backoff time for retransmitting the communication information according to the backoff upper limit.

In order to further avoid competition conflicts, this embodiment may further include a step of setting the backoff lower limit, whereby it is possible to separate backoff times of a plurality of UEs from one another—that is to say, this embodiment may further include the following Step 209.

Step 209: the UE obtaining a backoff lower limit for transmitting the communication information.

The modes for the UE to obtain a backoff lower limit may include the following: (1) the UE may receive the backoff lower limit transmitted from the base station through physical layer signaling, broadcasting or a dedicated message; (2) the UE may obtain the backoff lower limit according to an instruction of an application layer; and (3) the UE obtains the backoff lower limit according to the backoff upper limit obtained above and a backoff time window transmitted from the base station—for example, the backoff upper limit obtained by the UE above is 70 ms, and the backoff time window transmitted from the base station is 20 ms, whereby it is possible to obtain the backoff lower limit as 70−20=50 ms.

Step 210: the UE selecting a backoff time for retransmitting the communication information according to the backoff upper limit and the backoff lower limit.

The UE randomly selects a backoff time between the backoff lower limit and the backoff upper limit as obtained, and retransmits the communication information after the backoff time has elapsed.

In this embodiment, when failing to transmit communication information to the base station, the UE obtains a first backoff upper limit according to the number of times the transmission has failed, receives a second backoff upper limit transmitted from the base station, takes a minimum value from the first backoff upper limit and the second backoff upper limit as a backoff upper limit, and selects a backoff time for retransmitting the communication information according to the backoff upper limit and the backoff lower limit, so that the UE can obtain a suitable backoff upper limit according to the number of times it has failed to transmit the communication information, thereby reducing the delay in the transmission of uplink data by the UE. Moreover, the base station further allocates at least one competed resource to each UE, and the UE is allowed to select a competed resource for use, thereby further lowering conflicts in competing for transmission.

As comprehensible to persons ordinarily skilled in the art, the entire or partial steps achieving the aforementioned method embodiments can be accomplished by relevant hardware instructed by a program, and the program can be stored in a computer-readable storage medium and execute the steps of the aforementioned method embodiments when executed. The storage medium includes various media capable of storing program codes such as an ROM, an RAM, a magnetic disc, or an optical disc, and so on.

Figure 3:
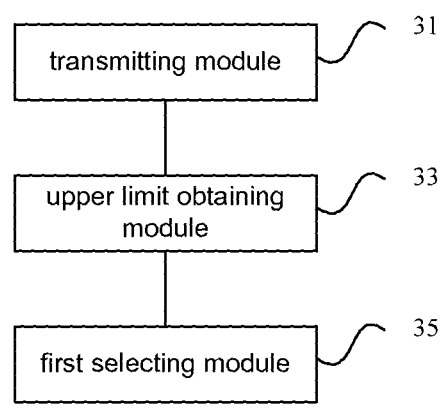
FIG. 3 is a schematic diagram exemplarily illustrating the first embodiment of an apparatus for communication information transmission according to the present invention.

FIG. 3 is a schematic diagram exemplarily illustrating the first embodiment of an apparatus for communication information transmission according to the present invention. As shown in FIG. 3, the apparatus comprises a transmitting module 31, an upper limit obtaining module 33, and a first selecting module 35.

The transmitting module 31 is configured to transmit communication information to a base station.

The upper limit obtaining module 33 is configured to obtain a first backoff upper limit, when the transmitting module 31 fails to transmit the communication information to the base station, according to the number of times the transmission has failed.

The first selecting module 35 is configured to determine a backoff upper limit according to the first backoff upper limit obtained by the upper limit obtaining module 33, and selecting a backoff time for retransmitting the communication information according to the backoff upper limit.

See the relevant descriptions in the aforementioned various method embodiments for the working flows and working principles of each of the modules in this embodiment, while no repetition will be made in this context. The apparatus for communication information transmission provided by this embodiment may be contained in the terminals of the aforementioned various method embodiments.

According to this embodiment of the present invention, when the transmitting module fails to transmit communication information to the base station, the upper limit obtaining module obtains a first backoff upper limit according to the number of times the transmission has failed, and the first selecting module determines a backoff upper limit according to the first backoff upper limit, and selects a backoff time for retransmitting the communication information according to the backoff upper limit, so that the UE can obtain a suitable backoff upper limit according to the number of times it has failed to transmit the communication information, thereby reducing the delay in the transmission of uplink data by the UE.

Figure 4:
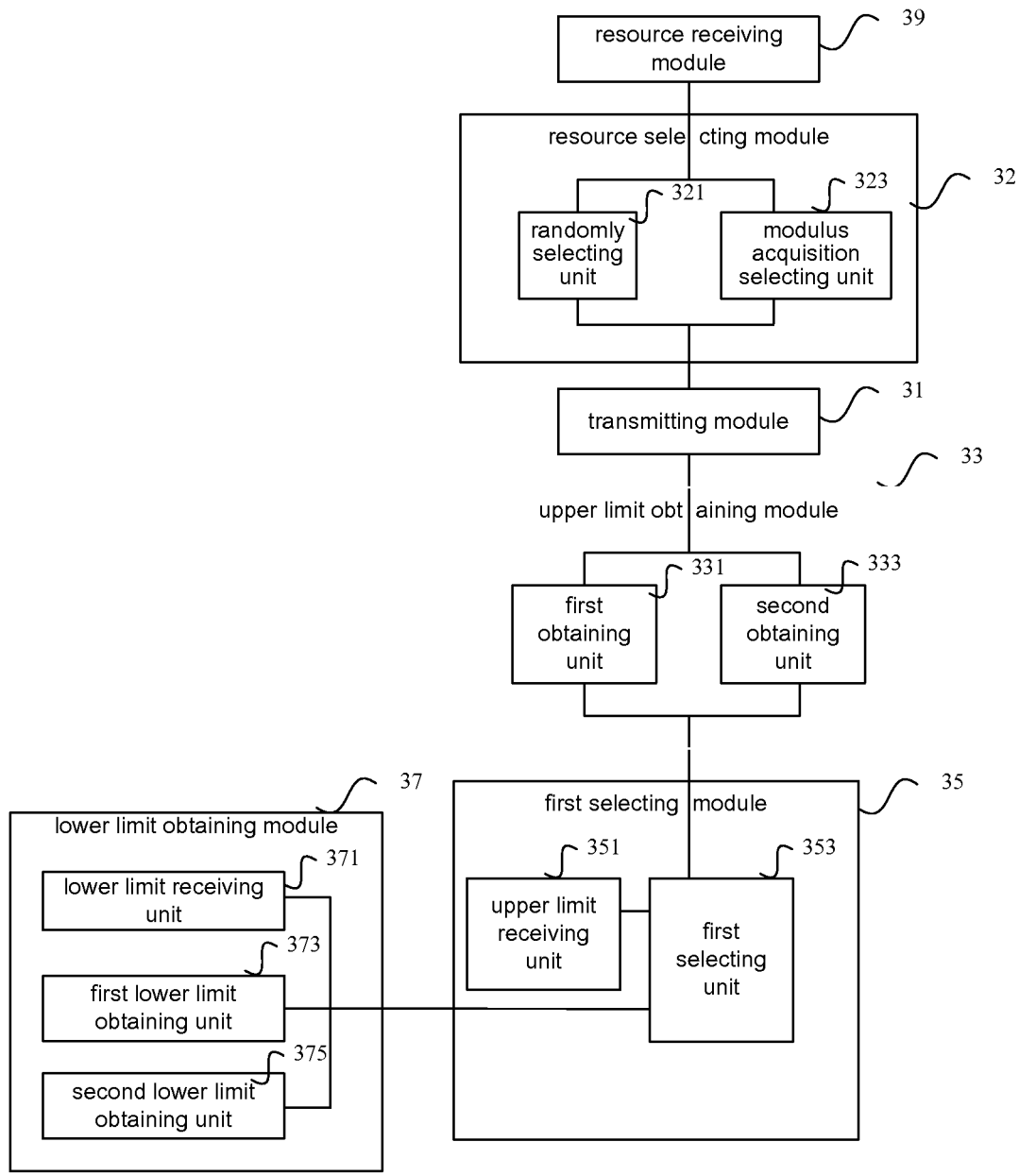
FIG. 4 is a schematic diagram exemplarily illustrating the second embodiment of an apparatus for communication information transmission according to the present invention.

FIG. 4 is a schematic diagram exemplarily illustrating the second embodiment of an apparatus for communication information transmission according to the present invention. On the basis of the embodiment illustrated in FIG. 3, the apparatus further comprises, as shown in FIG. 4, a resource receiving module 39 and a resource selecting module 32.

The resource receiving module 39 is configured to receive one or more competed resources transmitted from the base station for transmitting the communication information before the transmitting module 31 transmits the communication information to the base station.

The resource selecting module 32 is configured to select one competed resource from the one or more competed resources received by the resource receiving module 39 to transmit the communication information.

Moreover, the upper limit obtaining module 33 may comprise a first obtaining unit 331 and/or a second obtaining unit 333.

The first obtaining unit 331 is configured to obtain a backoff parameter according to a signal transmitted from the base station, and obtaining the first backoff upper limit according to the following formula 1, when a numerical value of the first backoff upper limit increases with an increase in the number of times the transmission has failed: formula 1: $T1=2^{(i-1)}*T2$, or $T1=(i-1)*T2$, where i represents the number of times the transmission has failed, T1 represents the first backoff upper limit, and T2 represents the backoff parameter. The second obtaining unit 333 is configured to obtain a first time already taken to transmit the communication information and a delay requirement corresponding to transmission of the communication information, and obtaining the first backoff upper limit according to the first time and the delay requirement, when a numerical value of the first backoff upper limit decreases with an increase in the number of times the transmission has failed.

The first selecting module 35 may comprise an upper limit receiving unit 351 and a first selecting unit 353.

The upper limit receiving unit 351 is configured to receive a second backoff upper limit transmitted from the base station when the communication information fails to be transmitted to the base station. The first selecting unit 353 is configured to take a minimum value from the first backoff upper limit and the second backoff upper limit as the backoff upper limit, and selecting the backoff time for retransmitting the communication information according to the backoff upper limit.

Furthermore, the apparatus further comprises a lower limit obtaining module 37.

The lower limit obtaining module 37 is configured to obtain a backoff lower limit for transmitting the communication information.

The first selecting module 35 can be specifically configured to determine the backoff upper limit according to the first backoff upper limit obtained by the upper limit obtaining module 33, and selecting the backoff time for retransmitting the communication information according to the backoff upper limit and the backoff lower limit obtained by the lower limit obtaining module 37.

The lower limit obtaining module 37 may comprise a lower limit receiving unit 371, a first lower limit obtaining unit 373 or a second lower limit obtaining unit 375.

The lower limit receiving unit 371 is configured to receive the backoff lower limit transmitted from the base station. The first lower limit obtaining unit 373 is configured to obtain the backoff lower limit according to an instruction of an application layer. The second lower limit obtaining unit 375 is configured to obtain the backoff lower limit according to the backoff upper limit and a backoff time window transmitted from the base station.

The resource receiving module 39 is further specifically configured to receive, before the transmitting module 31 transmits the communication information to the base station, one or more competed resources transmitted from the base station for transmitting the communication information according to resource identities allocated by the base station to terminals, wherein each terminal is allocated by the base station with at least one resource identity, and each resource identity corresponds to at least one competed resource.

The resource selecting module 32 comprises a randomly selecting unit 321 or a modulus acquisition selecting unit 323.

The randomly selecting unit 321 is configured to randomly select one competed resource from the one or more competed resources to transmit the communication information. The modulus acquisition selecting unit 323 is configured to acquire a modulus of the number of the one or more competed resources with respect to a numerical value of identity information of a current terminal to obtain a first remainder, and selecting a competed resource that corresponds to the first remainder to transmit the communication information.

The transmitting module 31 is further specifically configured to use the competed resources selected by the resource selecting module 32 to transmit communication resources.

See the relevant descriptions in the aforementioned various method embodiments for the working flows and working principles of each of the modules and units in this embodiment, while no repetition will be made in this context. The apparatus for communication information transmission provided by this embodiment may be contained in the terminals of the aforementioned various method embodiments.

In this embodiment, when failing to transmit communication information to the base station, the UE obtains a first backoff upper limit according to the number of times the transmission has failed, receives a second backoff upper limit transmitted from the base station, takes a minimum value from the first backoff upper limit and the second backoff upper limit as a backoff upper limit, and selects a backoff time for retransmitting the communication information according to the backoff upper limit and the backoff lower limit, so that the UE can obtain a suitable backoff upper limit according to the number of times it has failed to transmit the communication information, thereby reducing the delay in the transmission of uplink data by the UE. Moreover, the base station further allocates at least one competed resource to each UE, and the UE is allowed to select a competed resource for use, thereby further lowering conflicts in competing for transmission.

An embodiment of the present invention further provides a system for communication information transmission, comprising: a base station and a terminal, of which the terminal comprises any apparatus for communication information transmission provided by the embodiments of the present invention.

Moreover, the base station comprises a resource allocating module and a resource transmitting module.

The resource allocating module is configured to allocate at least one resource identity to each terminal corresponding to the base station.

The resource transmitting module is configured to transmit competed resources containing the resource identities, wherein each resource identity corresponds to at least one competed resource.

This embodiment of the present invention possesses the advantageous effects of the aforementioned various embodiments.

As should be finally noted, the aforementioned embodiments are merely meant to explain, rather than to restrict, the technical solutions of the present invention. Although the present invention has been explained in detail with reference to the foregoing embodiments, it should be understood by persons ordinarily skilled in the art that it is still possible to modify the technical solutions recorded in the aforementioned various embodiments or to equivalently substitute partial technical features therein, and that all these modifications or substitutions do not essentially depart the corresponding technical solutions from the spirits and scopes of the technical solutions exemplified in the various embodiments of the present invention.

What is claimed is:

1. A method for communication information transmission, comprising:
   transmitting, by a transmitter of a user equipment, communication information to a base station;
   obtaining, by a processor of the user equipment, a first backoff upper limit, when the communication information fails to be transmitted to the base station, according to a number of times the transmission has failed; and
   determining, by the processor of the user equipment, a backoff upper limit according to the first backoff upper limit, and selecting, by the processor of the user equipment, a backoff time for retransmitting the communication information according to the backoff upper limit,
wherein a numerical value of the first backoff upper limit increases with an increase in the number of times the transmission has failed; and
the obtaining, by the processor of the user equipment, the first backoff upper limit according to the number of times the transmission has failed comprises:
obtaining, by the processor of the user equipment, a backoff parameter according to a signal transmitted from the base station, wherein the backoff parameter is an allocation interval of competed resources required for transmitting the communication information, and
obtaining, by the processor of the user equipment, the first backoff upper limit according to the following formula I:

$$T1=2(i-1)*T2, \text{ or } T1=(i-1)*T2; \quad \text{formula I}$$

where i represents the number of times the transmission has failed, T1 represents the first backoff upper limit, and T2 represents the backoff parameter.

2. The method for communication information transmission according to claim 1, wherein the determining, by the processor of the user equipment, the backoff upper limit according to the first backoff upper limit comprises:
receiving, by the processor of the user equipment, a second backoff upper limit transmitted from the base station when the communication information fails to be transmitted to the base station; and
taking, by the processor of the user equipment, a minimum value from the first backoff upper limit and the second backoff upper limit as the backoff upper limit.

3. The method for communication information transmission according to claim 1, wherein the communication information comprises a random access signal, scheduling request resource signaling or service data.

4. The method for communication information transmission according to claim 1, further comprising obtaining, by the processor of the user equipment, a backoff lower limit for transmitting the communication information; wherein
the selecting, by the processor of the user equipment, a backoff time for retransmitting the communication information according to the backoff upper limit comprises:
selecting, by the processor of the user equipment, the backoff time for retransmitting the communication information according to the backoff upper limit and the backoff lower limit.

5. The method for communication information transmission according to claim 4, wherein the obtaining, by the processor of the user equipment, a backoff lower limit for transmitting the communication information comprises:
receiving, by the processor of the user equipment, the backoff lower limit transmitted from the base station.

6. The method for communication information transmission according to claim 4, wherein the obtaining, by the processor of the user equipment, a backoff lower limit for transmitting the communication information comprises:
obtaining, by the processor of the user equipment, the backoff lower limit according to an instruction of an application layer.

7. The method for communication information transmission according to claim 4, wherein the obtaining, by the processor of the user equipment, a backoff lower limit for transmitting the communication information comprises:
obtaining, by the processor of the user equipment, the backoff lower limit according to the backoff upper limit and a backoff time window transmitted from the base station.

8. The method for communication information transmission according to claim 1, further comprising, prior to the transmitting, by the transmitter of the user equipment, communication information to a base station:
receiving, by a receiver of the user equipment, one or more competed resources transmitted from the base station for transmitting the communication information; and
selecting, by the processor of the user equipment, at least one competed resource from the one or more competed resources to transmit the communication information.

9. The method for communication information transmission according to claim 8, wherein the receiving, by the receiver of the user equipment, one or more competed resources transmitted from the base station for transmitting the communication information comprises:
receiving, by the receiver of the user equipment, one or more competed resources transmitted from the base station for transmitting the communication information according to resource identities allocated by the base station to terminals, wherein each terminal is allocated by the base station with at least one resource identity, and each resource identity corresponds to at least one competed resource.

10. The method for communication information transmission according to claim 8, wherein the selecting, by the processor of the user equipment, at least one competed resource from the one or more competed resources to transmit the communication information comprises:
randomly selecting, by the processor of the user equipment, at least one competed resource from the one or more competed resources to transmit the communication information; or
acquiring, by the processor of the user equipment, a modulus of the number of the one or more competed resources with respect to a numerical value of identity information of a current terminal to obtain a first remainder, and selecting, by the processor of the user equipment, a competed resource that corresponds to the first remainder to transmit the communication information.

11. An apparatus for communication information transmission, comprising:
a transmitter, configured to transmit communication information to a base station; and
a processor, configured to obtain a first backoff upper limit, when the transmitter fails to transmit the communication information to the base station, according to the number of times the transmission has failed; and configured to determine a backoff upper limit according to the first backoff upper limit obtained by the processor, and selecting a backoff time for retransmitting the communication information according to the backoff upper limit,
wherein processor is further configured to:
obtain a backoff parameter according to a signal transmitted from the base station, wherein the backoff parameter is an allocation interval of competed resources required for transmitting the communication information, and
obtain the first backoff upper limit according to the following formula I, when a numerical value of the first backoff upper limit increases with an increase in the number of times the transmission has failed: formula I: T1=2(i−1)*T2, or T1=(i−1)*T2; where i represents the number of times the transmission has failed, T1 represents the first backoff upper limit, and T2 represents the backoff parameter.

12. The apparatus for communication information transmission according to claim 11, wherein the processor is further configured to:
receive a second backoff upper limit transmitted from the base station when the communication information fails to be transmitted to the base station; and
take a minimum value from the first backoff upper limit and the second backoff upper limit as the backoff upper limit, and select the backoff time for retransmitting the communication information according to the backoff upper limit.

13. The apparatus for communication information transmission according to claim 11, wherein the processor is configured to obtain a backoff lower limit for transmitting the communication information;
to determine the backoff upper limit according to the obtained first backoff upper limit, and to select the backoff time for retransmitting the communication information according to the backoff upper limit and the obtained backoff lower.

14. The apparatus for communication information transmission according to claim 13, wherein the processor is further configured to:
receive the backoff lower limit transmitted from the base station.

15. The apparatus for communication information transmission according to claim 13, wherein the processor is further, configured to obtain the backoff lower limit according to an instruction of an application layer.

16. The apparatus for communication information transmission according to claim 13, wherein the processor is further configured to obtain the backoff lower limit according to the backoff upper limit and a backoff time window transmitted from the base station.

17. The apparatus for communication information transmission according to claim 11, further comprising:
a receiver, configured to receive one or more competed resources transmitted from the base station for transmitting the communication information before the transmitter transmits the communication information to the base station; and
wherein the processor is further configured to select one competed resource from the one or more competed resources to transmit the communication information; wherein
the transmitter is further configured to use the selected competed resource to transmit the communication resources.

18. The apparatus for communication information transmission according to claim 17, wherein the receiver is further configured to receive, before the transmitter transmits the communication information to the base station, the one or more competed resources transmitted from the base station for transmitting the communication information according to resource identities allocated by the base station to terminals, wherein each terminal is allocated by the base station with at least one resource identity, and each resource identity corresponds to at least one competed resource.

19. The apparatus for communication information transmission according to claim 11, wherein the processor is further configured to:
obtain a first time already taken to transmit the communication information and a delay requirement corresponding to transmission of the communication information, and
obtain the first backoff upper limit according to the first time and the delay requirement, when a numerical value of the first backoff upper limit decreases with an increase in the number of times the transmission has failed.

* * * * *